United States Patent Office 3,340,081
Patented Sept. 5, 1967

3,340,081
TREATMENT OF CARBON BLACK
Archie C. Teter, Bartlesville, Okla., assignor to Phillips Petroleum Company, a corporation of Delaware
No Drawing. Filed Dec. 26, 1963, Ser. No. 333,683
12 Claims. (Cl. 106—307)

This invention relates to the treatment of carbon black. In one aspect this invention relates to the fluorination of carbon black. In another aspect this invention relates to increasing the resilience and decreasing the heat build-up of a rubber vulcanizate. In another aspect this invention relates to decreasing the pH of a carbon black.

Carbon blacks such as furnace black, channel black, and lamp black are widely used industrially in a wide variety of processes. For many of said processes the quality and properties of the carbon black must be closely controlled. In many instances the processing art has advanced to such a degree that a wide variety of modified types within a particular class of carbon black are needed for different specific uses and purposes. Frequently, the process employed for the most economical production of a general purpose material is not readily adaptable for close quality control of the different modified types within the class of material.

For several years carbon black has been produced in large quantities in furnaces. The larger part of the carbon black produced today is used as a reinforcing agent for rubber. By far the larger part of the compounded rubber material containing carbon black is designed specifically for tire treads or tire carcasses. The state of the rubber compounding art for rubber used in tires and other articles has advanced to such a degree that the properties of the carbon black used in such compounding must be controlled within narrow limits. Such a control of all of the desired properties of the carbon black is often-times difficult to achieve.

Butyl rubber frequently presents more problems in connection with the reinforcing and compounding thereof than other types of rubber. For example, it is difficult to obtain the desired amount of interaction between carbon black and butyl rubber because of the low amount of unsaturation in the rubber. Consequently, the properties of the vulcanized butyl stock frequently fall short of the standards desired for certain applications. Thus, a carbon black product which will impart improved properties to butyl rubber vulcanizates and a process for producing such a carbon black would be a valuable contribution to the art. If such a carbon black product also imparted improved properties to other types of rubber vulcanizates as well, the product and process for making same would be even more valuable.

The present invention provides such a carbon black product and a process for making same. I have now discovered that an improved valuable carbon black reinforcing agent for rubber can be produced by treating carbon black with a fluorinating agent such as sulfur tetrafluoride or an organic sulfur trifluoride. When conventional carbon blacks are replaced with a fluorinated carbon black in rubber, the vulcanized stock has a good balance of properties and significant improvements in heat build-up and resilience are realized. These improved properties are especially important in tire applications. Quite unexpectedly it has also been found that the improved carbon black of the invention is particularly useful in the compounding for butyl rubber. Furthermore, fluorination of carbon black results in a lowering of pH with no sacrifice in cure rate, as is often the case with low pH carbon blacks. This is one of the several advantages of the invention and is of considerable importance in the curing of rubber stocks. In some cases the cure rate is even more rapid with the fluorinated carbon black than it is with the comparable untreated carbon black.

Thus, broadly speaking, the present invention resides in a fluorinated carbon black product and a process for producing same, said process comprising contacting a carbon black in a contacting zone with a fluorinating agent such as sulfur tetrafluoride or an organic sulfur trifluoride and recovering the thus treated carbon black.

An object of this invention is to provide an improved carbon black. Another object of this invention is to provide a fluorinated carbon black. Another object of this invention is to provide a process for fluorinating carbon black. Still another object of this invention is to provide a process for producing a carbon black which when compounded in rubber will increase the resilience and decrease the heat build-up of the resulting vulcanizate. Another object of this invention is to provide a process for reducing the pH of a carbon black. Other aspects, objects, and advantages of the invention will be apparent to those skilled in the art in view of this disclosure.

Thus, according to the invention, there is provided a process for treating carbon black which process comprises: contacting said carbon black in a contacting zone with a fluorine containing compound having the formula $R-S-F_3$ wherein R is selected from the group consisting of a fluorine atom and hydrocarbon radicals containing from 1 to 20 carbon atoms, said contacting being carried out under carbon black fluorinating conditions; and recovering the thus treated carbon black.

Further according to the invention, there is provided a carbon black product consisting essentially of a carbon black containing a small but effective amount of fluorine.

Fluorinating agents which can be used in the practice of the invention and which can be represented by the above general formula include those wherein said hydrocarbon radical containing from 1 to 20 carbon atoms is selected from the group consisting of alkyl, cycloalkyl, aryl, alkylcycloalkyl, arylcycloalkyl, aralkyl, cycloalkylalkyl, alkaryl, and cycloalkylaryl radicals.

Examples of said fluorinating agents which can be used in the practice of the invention include, among others, the following:

sulfur tetrafluoride;
methylsulfur trifluoride;
n-propylsulfur trifluoride;
tert-butylsulfur trifluoride;
decylsulfur trifluoride;
eicosylsulfur trifluoride;
cyclopentylsulfur trifluoride;
cyclohexylsulfur trifluoride;
3-methylcyclopentylsulfur trifluoride;
2,4-dimethylcyclohexylsulfur trifluoride;
phenylsulfur trifluoride;
2-naphthylsulfur trifluoride;

4-phenylcyclohexylsulfur trifluoride;
benzylsulfur trifluoride;
14-phenyltetradecylsulfur trifluoride;
3-cyclohexylpropylsulfur trifluoride;
3,5-di-n-propylphenylsulfur trifluoride;
4-cyclopentylphenylsulfur trifluoride; and the like.

When operating in accordance with the process of this invention, carbon black is contacted with a fluorinating agent of the type hereinbefore described at a temperature which can vary over a fairly broad range. The temperature is generally in the range of from 25 to 800° C., preferably 100 to 400° C. The treatment or contacting can be effected at either atmospheric or superatmospheric pressure, i.e., within the range of from atmospheric to 250 p.s.i.g. The contacting, treating, or reaction time will depend upon both the temperature and pressure and can be in the range of from 5 minutes to 30 hours, or longer. For most purposes good results can be obtained when the treating time is in the range of 30 minutes to 15 hours.

The amount of fluorinating agent utilized in the practice of the invention can vary within wide limits depending upon the amount of fluorination desired in the carbon black product. Generally speaking, the amount of fluorinating agent utilized will be an amount sufficient to supply from 0.04 to 1.5, preferably 0.1 to 1.0 gram atoms of fluorine contained therein per 100 grams of carbon black being treated. When the fluorinating agent is a gas under the conditions of treatment, it can be diluted with an inert gas, e.g., nitrogen, helium, etc., if desired or convenient. When the fluorinating agent is a liquid under the conditions of treatment, it can be diluted with a suitable inert liquid diluent, e.g., carbon tetrafluoride, carbon tetrachloride, carbon disulfide, or a normally liquid hydrocarbon such as pentane, hexane, cyclohexane, benzene, toluene, and xylene. It is preferred, but not essential, that the fluorinating agent be soluble in said inert liquid diluent. It is sufficient if said fluorinating agent can be dispersed in said diluent.

The amount of fluorine retained in the fluorinated carbon black product will vary with the fluorinating agent used and the fluorinating conditions utilized. Fluorination at pressures above atmospheric pressure usually results in a carbon black product having a higher fluorine content than a carbon black which is fluorinated at atmospheric pressure. In general, the amount of fluorine contained in the treated carbon black product will be a small but effective amount, within the range of from 0.05 to 7 weight percent, sufficient to change the properties of the carbon black per se and vulcanizates containing the same, as discussed herein. In general, the amount of sulfur contained in the treated carbon black product will be within the range of from 0 to 3.5 weight percent.

The invention is not limited to carrying out the contacting or treating of the carbon black with the fluorinating agent in any particular manner or in any particular apparatus. Any suitable method and any suitable apparatus can be employed. All that is required is that the carbon black to be treated be contacted with the desired fluorinating agent under fluorinating conditions. The carbon black to be treated can be either loose or pelleted. Thus, the contacting of the carbon black with the fluorinating agent can be carried out before, during, or after pelleting of the carbon black. In most instances, however, carbon black is marketed in pellet form and carrying out the treatment of the invention in the pelleting mills necessitates adding only a very small amount of additional equipment and produces quite satisfactory results. For example, in carrying out the treatment in a pelleting mill the fluorinating agent can be introduced into the conventional rotating pelleting mill or drum. In said mill or drum the bed of carbon black is turned over a great many times resulting in thorough contacting of the carbon black with the fluorinating agent. Said fluorinating agent and the treated carbon black are passed from the pelleting mill into a suitable separation vessel wherein a separation between said agent and the treated carbon black is effected. The treated carbon black is withdrawn from said separation vessel as one stream and a portion thereof can be recycled to the inlet of the pelleting mill, if desired. The fluorinating agent is withdrawn from said separation vessel as a separate stream and at least a portion thereof recycled to the inlet to the pelleting mill. Carrying out the treatment of the carbon black in a pelleting mill represents one preferred method in accordance with the invention. It is preferred that the fluorinating agent in such a method be a gas under the conditions of treatment.

The fluorinating treatment can, however, be practiced utilizing either loose carbon black or pelleted carbon black, with said treatment being accomplished in either a fixed bed, a fluidized bed, or suspended in a stream of the fluorinating agent. If desired, the fluorinating treatment can be carried out employing static methods such as where the carbon black is merely contacted with an atmosphere containing the desired fluorinating agent. Batch or continuous operation can be utilized in any of the various above-described contacting methods. It is preferred that water and water vapor be substantially excluded from the treating system.

The following examples will serve to further illustrate the invention. The carbon blacks treated in said examples were commercial pelleted carbon blacks.

Example I

A series of runs was made in which an easy processing channel black (Wyex), and a high abrasion furnace black (Philblack O) were treated with sulfur tetrafluoride. Data from said runs are presented in Table I below.

Runs 1 and 5 are control samples showing tests on the original untreated blacks.

In Runs 2, 3, 4, and 6, the treatment with sulfur tetrafluoride was carried out in a Pyrex tube 18 inches long and having an inside diameter of 1.5 inches. The tube reactor, placed in a vertical position, was fitted with a perforated Teflon wafer at the bottom to support the carbon black. A gas inlet tube was provided below said wafer for introduction of the sulfur tetrafluoride and an opening was provided at the top for escape of off gases. Sulfur tetrafluoride gas was introduced from a cylinder at 30-minute intervals, the amount added at each interval being approximately 2.5 grams and requiring about 5 seconds for addition. Heat was applied with a heating tape wrapped around the length of the reactor. The treatment was carried out at atmospheric pressure.

Runs 7, 8, and 9 were each carried out in a 1.5-liter stainless steel pressure vessel which was first evacuated and sulfur tetrafluoride gas was then introduced from a cylinder until the pressure in said vessel was 10-20 p.s.i.g. Said cylinder was weighed before and after introduction of the gas in order to determine the quantity used. Heat was applied with a heating tape to regulate the temperature at 250° C. At the end of each run excess gas was vented after the reactor had cooled to room temperature.

In each of the above runs the treated carbon black was removed from the reactor, and the properties shown in Table I determined. A sample of each treated black was then extracted with water overnight to remove soluble and/or unstable products and was then dried in a vacuum oven at 150° C. Tests on said water-extracted samples are also shown in Table I.

The data in Table I show that all the treated samples contained fluorine. The data for Runs 3 and 4 indicate the fluorinating agents of the invention can be used to fluorinate carbon blacks with very little, if any, increase in the sulfur content of the carbon black. Treatment with sulfur tetrafluoride lowered pH of the carbon blacks.

TABLE I

| | 1 | 2 | 3 | 4 | 5 | 6 | 7 | 8 | 9 |
|---|---|---|---|---|---|---|---|---|---|
| Carbon black, type | Channel (Wyex) (control) | Channel (Wyex) | Channel (Wyex) | Channel (Wyex) | Furnace (Philblack O) (control) | Furnace (Philblack O) | Channel (Wyex) | Channel (Wyex) | Furnace (Philblack O) |
| Black treated, grams | | 75 | 100 | 100 | | 75 | 100 | 150 | 100 |
| $SF_4$ used, grams [1] | | 10 | 10 | 27.5 | | 25 | 16 | 19 | 13 |
| Treating temp., °C | | 150 | 250 | 250 | | 250 | 250 | 250 | 250 |
| Treating time, hours | | 2 | 2 | 5.5 | | 5.0 | 4.5 | 6 | 6.5 |
| Treating pressure, p.s.i.g. | | 0 | 0 | 0 | | 0 | 100 | 150 | 75 |
| pH, original | 4.0 | 1.3 | 1.8 | 1.7 | 8.4 | 2.8 | 2.52 | | 3.0 |
| pH, water extracted | | 3.0 | 3.3 | 2.8 | | 4.2 | 0.87 | 0.9 | 1.0 |
| Oil absorption, cc./g. | 0.90 | 0.91 | | 0.87 | 1.18 | 1.09 | 3.88 | | 6.37 |
| $F_2$, wt. percent, original sample | 0 | 1.25 | 0.51 | 2.40 | 0 | 0.74 | 2.25 | 2.27 | 3.80 |
| $F_2$, wt. percent, water extracted | 0 | 0.19 | 0.09 | 0.80 | 0 | 0.18 | 2.5 | | 2.07 |
| S, wt. percent, original sample | 0.12 | 3.1 | 0.14 | 1.3 | | 1.1 | 2.4 | 3.2 | 2.10 |
| S, wt. percent, water extracted | | 0.95 | 0.27 | 0.16 | | 0.99 | | | |
| Volatile matter, wt. percent | 5.13 | 7.65 | 5.64 | ²6.86 | 2.05 | ²2.34 | | | |

[1] Approximate values. ² Determined on extracted sample.

Example II

Samples of the treated and water-extracted channel black from Runs 4 and 7, the treated and water-extracted furnace black from Run 9, and control blacks 1 and 5 from Example I were used as reinforcing agents in the following tread stock recipe:

| | Parts by weight |
|---|---|
| Butadiene/styrene rubber [1] | 100 |
| Carbon black | 50 |
| Aromatic oil (Philrich 5) | 10 |
| Zinc oxide | 3 |
| Stearic acid | 1 |
| Flexamine [2] | 1 |
| Sulfur | 1.75 |
| Santocure [3] | 1.3 |

[1] Copolymer prepared by emulsion polymerization at 41° F. using a rosin acid soap emulsifier; salt-acid coagulated; 23.5 weight per cent bound styrene; ML-4 at 212° F., 52.
[2] Physical mixture containing 65 per cent of a complex diarylamine-ketone reaction product and 35 per cent of N,N'-diphenyl-p-phenylenediamine.
[3] N-cyclohexyl-2-benzothiazolesulfenamide.

The stocks were mixed, cured at 307° F., and physical properties determined. Samples for modulus, tensile, and elongation determinations were cured 30 minutes; samples for the other tests were cured 40 minutes. Results are presented in Table II.

The data in Table II show that vulcanizates in which treated channel black was used had higher modulus, higher tensile strength, higher resilience, and lower heat build-up than the control. The treated furnace black gave a vulcanizate having higher tensile strength, higher elongation, higher resilience, and lower heat build-up than the control. The increased resilience and decreased heat build-up obtained on these vulcanizates are especially important in tire applications.

TABLE II

| | Carbon Black from Run— | | | | |
|---|---|---|---|---|---|
| | 1 | 4 | 7 | 5 | 9 |
| | Parent black | | | | |
| | Wyex (control) | Wyex | Wyex | Philblack O (control) | Philblack O |
| Fluorine, wt. percent | 0 | 0.80 | 2.25 | 0 | 3.80 |
| Cross-linking, $\nu \times 10^4$, moles/cc. | 1.09 | 1.49 | 1.31 | 1.45 | 1.53 |
| 300% modulus, p.s.i. | 640 | 1,150 | 980 | 1,430 | 1,290 |
| Tensile, p.s.i. | 3,310 | 3,610 | 3,730 | 3,390 | 3,830 |
| Elongation, percent | 820 | 640 | 730 | 580 | 650 |
| Shore A hardness | 60 | 60 | 61 | 61 | 63 |
| Heat build-up, $\Delta T$, °F. | 65.2 | 55.6 | 55.0 | 66.0 | 61.6 |
| Resilience, percent | 58.6 | 64.2 | 64.5 | 60.0 | 63.0 |

Example III

Samples of the treated and water-extracted channel black prepared in Runs 4 and 7, the treated and water-extracted furnace black from Run 9, and control blacks 1 and 5 from Example I were evaluated as reinforcing agents in butyl rubber (Enjay Butyl 218, sp. gr. 0.92, ML-3 at 260° F. or 50–60). The following compounding recipe was used:

| | Parts by weight |
|---|---|
| Butyl rubber | 100 |
| Carbon black | 50 |
| Stearic acid | 0.5 |
| Zinc oxide | 5 |
| Sulfur | 2 |
| Methyl Tuads [1] | 1 |
| Captax [2] | 1 |

[1] Tetramethyl thiuram disulfide.
[2] Mercaptobenzothiazole.

The black was first incorporated into the rubber on a 240° F. roll mill after which the mixture was heated in vacuo for 10 minutes at 150° C. The bound rubber was determined. The remaining compounding ingredients were added on a 240° F. roll mill. The stocks were then cured 40 minutes at 307° F. and physical properties determined. The results are presented in Table III.

TABLE III

| Physical Properties | Carbon Black from Run— | | | | |
|---|---|---|---|---|---|
| | 1 | 4 | 7 | 5 | 9 |
| | Bound rubber, wt. percent | | | | |
| | 20.9 | 36.0 | 25.9 | 11.9 | 25.5 |
| $v \times 10^4$, Moles/cc | 1.13 | 1.17 | 1.13 | 1.35 | 1.31 |
| 300% Modulus, p.s.i | 1,070 | 1,150 | 1,070 | 1,370 | 1,470 |
| Tensile, p.s.i | 3,170 | 3,130 | 2,830 | 2,700 | 2,660 |
| Elongation, percent | 600 | 580 | 590 | 540 | 490 |
| Shore A Hardness | 58 | 57 | 51 | 63 | 58 |
| $\Delta T$, °F | 50.0 | 44.4 | 48.4 | 65.7 | 59.5 |
| Resilience, percent | 58.6 | 62.9 | 63.2 | 53.0 | 54.4 |

The data in Table III show that vulcanizates prepared from the fluorinated carbon blacks had significantly lower heat build-up and higher resilience than the vulcanizates prepared from the parent black.

It is known that commercial carbon blacks (such as the above control blacks) contain surface oxygen, at least a portion of which is present in various types of surface combinations. While it is not intended to limit the invention by any theory of operation, it is presently believed that fluorine reacts or combines with carbon black in some manner not specifically known at present and forms various types of surface combinations therewith. The data given in Table I show that the fluorine is definitely bound to the carbon black in some manner. It is presently believed that said fluorine is bound to the carbon black in various types of surface combinations which are formed at both former oxygen bearing sites and non-oxygen bearing sites.

Bound rubber is determined by the following procedure. Gel is determined first. One-tenth gram of the polymer plus carbon black mixture is placed in a wire cage made from 80-mesh screen and the cage then placed in 100 ml. of toluene contained in a wide-mouth, 4-ounce bottle. After standing at room temperature (approximately 77° F.) for 24 hours, the cage containing the isoluble material is removed.

Prior to the determination of gel, the cage is calibrated for toluene retention in order to correct the weight of swelled gel retained in the cage and to determine accurately the weight of dry gel. The empty cage is immersed in toluene and then allowed to drain three minutes in a closed wide-mouth, 2-ounce bottle. A piece of quarter-inch hardware cloth in the bottom of the bottle supports the cage with minimum contact. The bottle containing the cage is weighed to the nearest 0.02 gram during a minimum 3-minute draining period after which the cage is withdrawn and the bottle again weighed to the nearest 0.02 gram. The difference in the two weighings is the weight of the cage plus the toluene retained by it, and by subtracting the weight of the empty cage from this value the weight of toluene retention is found, i.e., the cage calibration.

In the gel determination, after the cage containing the sample has stood for 24 hours in toluene, the cage is withdrawn from the bottle with the aid of forceps and placed in the 2-ounce bottle. The same procedure is followed for determining the weight of swelled gel as was used for calibration of the cage. The weight of swelled gel is corrected by subtracting the cage calibration.

The value for bound rubber is determined from gel data and a knowledge of the compounding recipe, as follows:

$$\text{Gel, weight percent} = \frac{\text{Weight insoluble material} \times 100}{\text{Weight of sample}}$$

$$\text{Percent Bound rubber} = \frac{[(\text{percent gel}) - X]100}{y}$$

$$X = \frac{(\text{Carbon black} + Z_nO + S)100}{F}$$

$F$ = total recipe formula of compounded stock based on 100 parts of rubber $$y = \frac{100}{F}(100)$$

Oil absorption is measured by adding oil a few drops at a time to a one gram sample of carbon black on a mixing stone or glass plate. After each addition the oil is incorporated thoroughly with a spatula, using moderate pressure. Tiny pellets are formed, gradually increasing in size as more oil is added. The end point, approached one drop of oil at a time, is read when a single ball of stiff paste is formed. The results are reported as cc. oil per gram of black, or converted to gallons of oil per 100 pounds of black.

In the above tables the term "300 percent modulus, p.s.i." refers to the pounds per square inch pull in a tension test when the test piece of vulcanized rubber has been stretched 300 percent of the length of the original test piece. The term "tensile p.s.i." represents the pounds per square inch pull at the point of rupture or break of the test piece undergoing the above-mentioned 300 percent modules test. The term "elongation" represents the stretch or elongation at the point of break. All of said tests are determined in accordance with ASTM D 412–51T, and are carried out at 80° F. unless otherwise designated.

"Cross-linking" is determined by the Kraus method described in Rubber World 135, 67–73, 254–260 (1956).

Shore A hardness is determined according to ASTM D 676–55T, using a Type A Shore Durometer.

$\Delta T$, ° F. is determined by ASTM D 623–52T. The test is designed to evaluate the relative heat generation or hysteresis (heat build-up) of rubber vulcanizates. The test specimen is a right circular cylinder 0.7 inch in diameter and one inch high. Machine operation: 143 p.s.i. load; 0.175-inch stroke.

Resilience, percent is determined by ASTM D 945–55 (modified). The test specimen is a right circular cylinder 0.7 inch in diameter and one inch high.

Typical properties of Philrich 5, the aromatic oil used in Example II above, are as follows:

| Property | Typical Value | Test Method |
|---|---|---|
| API Gravity, 60° F | 11.6 | ASTM D 287–54 |
| Specific Gravity, 60/60° F | 0.9888 | ASTM D 287–54 |
| Density at 60° F., lb./gal | 8.235 | ASTM D 1250–53 |
| Flash Point by COC, ° F | 480 | ASTN D 92–52 |
| Fire Point by COC, ° F | 560 | ASTM D 92–52 |
| Pour Point, ° F | +45 | ASTM D 97–47 |
| Viscosity, SUV at 210° F | 175 | ASTM D 88–53 |
| Aniline Point, ° F | 110 | ASTM D 611–53T |
| Carbon Residue, wt. percent | 3.25 | ASTM D 189–52 |
| Rostler Analyses, wt. percent:[1] | | |
| Asphaltenes | 0.0 | |
| Nitrogen Bases | 11.0 | |
| First Acidaffins | 19.0 | |
| Second Acidaffins | 61.0 | |
| Paraffins | 9.0 | |

[1] Fritz S. Rostler and Heinz W. Sternberg; "Compounding Rubber with Petroleum Products," Ind. Eng. Chem. 41 598, (1949).

While the invention has been described above with particular reference to channel black and furnace black, the invention is not limited to the fluorination of channel black and furnace black. It is within the scope of

I claim:

1. A process for treating carbon black which process comprises: contacting said carbon black in a contacting zone with a fluorine containing compound having the formula R—S—F$_3$ wherein R is selected from the group consisting of a fluorine atom and hydrocarbon radicals containing from 1 to 20 carbon atoms, said contacting being carried out with an amount of said fluorine containing compound and under treating conditions of time, temperature, and pressure which are sufficient to cause the fluorination of said carbon black; and recovering the thus treated carbon black containing a small but effective amount of fluorine sufficient to improve at least one of the modulus, the tensile strength, the resilience, and the heat build-up of a rubber vulcanizate containing said carbon black.

2. A process according to claim 1 wherein said fluorine containing compound is sulfur tetrafluoride.

3. A process for fluorinating carbon black, which process comprises: contacting said carbon black in a contacting zone with a fluorine containing compound having the formula R—S—F$_3$ wherein R is selected from the group consisting of a fluorine atom and hydrocarbon radicals containing from 1 to 20 carbon atoms, said contacting being carried out at a temperature within the range of from 25 to 800° C., a pressure within the range of from atmospheric to 250 p.s.i.g., and for a period of time within the range of from 5 minutes to 30 hours with an amount of said fluorine containing compound sufficient to fluorinate said carbon black; and recovering fluorinated carbon black containing a small but effective amount of fluorine sufficient to improve at least one of the modulus, the tensile strength, the resilience, and the heat build-up of a rubber vulcanizate containing said carbon black.

4. A process according to claim 3 wherein said fluorine containing compound is sulfur tetrafluoride.

5. A process according to claim 4 wherein said untreated carbon black is channel black.

6. A process according to claim 4 wherein said untreated carbon black is a furnace black.

7. A process for treating carbon black to increase the resilience and decrease the heat build-up of a rubber vulcanizate containing the same, which process comprises: contacting said carbon black in a contacting zone with from 0.04 to 1.5 gram atoms of fluorine per 100 grams of said carbon black, said fluorine being contained in a fluorine containing compound having the formula R—S—F$_3$ wherein R is selected from the group consisting of a fluorine atom and hydrocarbon radicals containing from 1 to 20 carbon atoms, said contacting being carried out at a temperature within the range of from 25 to 800° C., a pressure within the range of from atmospheric to 250 p.s.i.g., and for a period of time within the range of from 5 minutes to 30 hours and recovering the thus treated carbon black.

8. A process according to claim 7 wherein said fluorine containing compound is sulfur tetrafluoride.

9. A process according to claim 8 wherein said untreated carbon black is channel black.

10. A process according to claim 8 wherein said untreated black is a furnace black.

11. A process for treating carbon black to reduce the pH thereof, which process comprises: contacting said carbon black in a contacting zone with a fluorine containing compound having the formula R—S—F$_3$ wherein R is selected from the group consisting of a fluorine atom and hydrocarbon radicals containing from 1 to 20 carbon atoms, said contacting being carried out at a sufficient temperature, for a sufficient period of time, and with an amount of said fluorine containing compound sufficient to decrease the pH of said carbon black; and recovering carbon black having a substantially reduced pH.

12. A process according to claim 11 wherein said fluorine containing compound is sulfur tetrafluoride.

References Cited
UNITED STATES PATENTS

| | | | |
|---|---|---|---|
| 2,408,696 | 10/1946 | Smallwood | 106—307 |
| 2,631,107 | 3/1953 | Leatherman | 106—307 |
| 2,636,831 | 4/1953 | Carney | 106—307 |
| 2,641,533 | 6/1953 | Cines et al. | 106—307 |
| 3,043,708 | 7/1962 | Watson et al. | 106—307 |
| 3,140,192 | 7/1964 | Jordan et al. | 106—307 |

TOBIAS E. LEVOW, *Primary Examiner.*

HELEN M. McCARTHY, S. E. MOTT, *Examiners.*